United States Patent
Yanase et al.

(10) Patent No.: US 9,261,183 B2
(45) Date of Patent: Feb. 16, 2016

(54) DIFFERENTIAL DEVICE

(71) Applicant: MUSASHI SEIMITSU INDUSTRY CO., LTD., Toyohashi-shi, Aichi (JP)

(72) Inventors: Yoichi Yanase, Toyohashi (JP); Tsunefumi Niiyama, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 3 days.

(21) Appl. No.: 14/611,562

(22) Filed: Feb. 2, 2015

(65) Prior Publication Data

US 2015/0226301 A1 Aug. 13, 2015

(30) Foreign Application Priority Data

Feb. 7, 2014 (JP) .................................. 2014-022739

(51) Int. Cl.
*F16H 48/38* (2012.01)
*F16H 48/08* (2006.01)

(52) U.S. Cl.
CPC ................ *F16H 48/38* (2013.01); *F16H 48/08* (2013.01)

(58) Field of Classification Search
CPC ....... F16H 57/02; F16H 57/037; F16H 48/38; F16H 48/382
USPC .................... 475/230; 74/444, 446, 447, 451; 464/172, 183
See application file for complete search history.

(56) References Cited

U.S. PATENT DOCUMENTS 3,651,713 A * 3/1972 Mueller ......................... 475/230
7,452,006 B2 * 11/2008 Kohda ........................... 285/316

FOREIGN PATENT DOCUMENTS

JP 2001-141038 * 5/2001 ............. F16H 57/02
JP 3751488 B2 3/2006
JP 2013-072524 A 4/2013

* cited by examiner

*Primary Examiner* — Robert Hodge
*Assistant Examiner* — Stacey Fluhart
(74) *Attorney, Agent, or Firm* — Carrier Blackman & Associates, P.C.; Joseph P. Carrier; William D. Blackman

(57) ABSTRACT

In a differential device, an outer tube portion is formed in one of a side gear and a sleeve, and an inner tube portion fitted to an inner periphery of the outer tube portion is formed in the other. A falling-off prevention device for preventing axial relative movement of the outer and inner tube portions is provided between the outer and inner tube portions. A seal member for shutting off communication between the falling-off prevention device and an inside of a differential case is set in a fitting portion between the outer and inner tube portions. Accordingly, lubricating oil in the differential case is prevented from leaking out of a space between the side gear and the sleeve without performing a special process such as pressure welding or adhesive bonding during assembly and which has good ease of assembly.

8 Claims, 11 Drawing Sheets

DIFFERENTIAL DEVICE

BACKGROUND OF THE INVENTION

1. Field of the Invention

The present invention relates to an improvement of a differential device comprising: a differential gear mechanism; and an integrated differential case housing the differential gear mechanism, the differential case including: first and second bearing bosses formed integrally on one side portion and another side portion of the differential case and aligned on a same axis to be rotatably supported by a transmission case; a work window for inserting the differential gear mechanism, the work window being provided in a peripheral wall of the differential case; a pair of sleeves fitted into the first and second bearing bosses from sides of outer ends thereof; oil seals being set between outer end portions of the sleeves which protrude from the first and second bearing bosses, and the transmission case; and left and right drive shafts, which are fitted and inserted into the sleeves, being spline-fitted to a pair of left and right side gears of the differential gear mechanism, the sleeves being connected to the side gears or the drive shafts.

2. Description of the Related Art

Such a differential device is known as disclosed in Japanese Patent No. 3751488 and Japanese Patent Application Laid-open No. 2013-72524.

In the above-described differential device, after the differential gear mechanism including the side gears is incorporated into the integrated differential case through the work window, the sleeves are fitted and inserted into the first and second bearing bosses from outside thereof to be spline-fitted to the side gears. In other words, if the side gear and the sleeve are integrated, a total length thereof becomes longer than an inside diameter of the integrated differential case, and the side gear and the sleeve cannot be incorporated into the differential case.

In the conventional differential device, the sleeve is connected to the side gear by pressure welding or adhesive bonding to prevent lubricating oil in the differential case from leaking out of a space between the side gear and the sleeve. However, during assembly, a special process such as pressure welding or adhesive bonding is an obstacle to improving efficiency of assembly.

SUMMARY OF THE INVENTION

The present invention has been made in view of the above-described circumstances, and an object of the present invention is to provide a differential device in which lubricating oil in a differential case is prevented from leaking out of a space between a side gear and a sleeve without performing a special process such as pressure welding or adhesive bonding during assembly and which has good ease of assembly.

In order to achieve the object, according to a first aspect of the present invention, there is provided a differential device comprising: a differential gear mechanism; and an integrated differential case housing the differential gear mechanism, the differential case including: first and second bearing bosses formed integrally on one side portion and another side portion of the differential case and aligned on a same axis to be rotatably supported by a transmission case; a work window for inserting the differential gear mechanism, the work window being provided in a peripheral wall of the differential case; and a pair of sleeves fitted into the first and second bearing bosses from sides of outer ends thereof, wherein oil seals are to be set between outer end portions of the sleeves which protrude from the first and second bearing bosses and the transmission case, and left and right drive shafts are to be fitted and inserted into the sleeves and to be spline-fitted to a pair of left and right side gears of the differential gear mechanism, the sleeves being to be connected to the side gears or the drive shafts, wherein an outer tube portion is formed in one of the side gear and the sleeve, and an inner tube portion fitted to an inner periphery of the outer tube portion is formed in the other, a falling-off prevention device for preventing axial relative movement of the outer and inner tube portions is provided between the outer and inner tube portions, and a seal member for shutting off communication between the falling-off prevention device and an inside of the differential case is set in a fitting portion between the outer and inner tube portions. Note that the seal member corresponds to an O-ring 37 described later in an embodiment of the present invention.

According to the first aspect of the present invention, the sleeve can be prevented from detaching from the bearing boss by the falling-off prevention device, lubricating oil in the differential case can be prevented from leaking out of the falling-off prevention device by the seal member, and the ease of assembly is good.

According to a second aspect of the present invention, in addition to the first aspect, the falling-off prevention device includes an annular first locking groove formed on an inner periphery of the outer tube portion, an annular first locking protrusion adjacent to the first locking groove, and an elastic piece formed in an inner end portion of the inner tube portion, the elastic piece having a second locking protrusion and a second locking groove capable of respectively engaging with the first locking groove and the first locking protrusion and being capable of bending inward in a radial direction; when the inner tube portion is inserted into the outer tube portion, and the second locking protrusion passes through the first locking protrusion, the elastic piece is bent inward in the radial direction by the first locking protrusion; and, after passage of the second locking protrusion through the first locking protrusion, the second locking protrusion and the second locking groove are respectively engaged with the first locking groove and the first locking protrusion by return of the elastic piece to a free state.

According to the second aspect of the present invention, the falling-off prevention device includes the annular first locking groove formed on the inner periphery of the outer tube portion, the annular first locking protrusion adjacent to the first locking groove, and the elastic piece which is formed in the inner end portion of the inner tube portion to have the second locking protrusion and the second locking groove capable of respectively engaging with the first locking groove and the first locking protrusion and which can bend inward in the radial direction. When the inner tube portion is inserted into the outer tube portion, and the second locking protrusion passes through the first locking protrusion, the elastic piece is bent inward in the radial direction by the first locking protrusion. After the passage of the second locking protrusion through the first locking protrusion, the second locking protrusion and the second locking groove are respectively engaged with the first locking groove and the first locking protrusion by the return of the elastic piece to a free state. Accordingly, the sleeve can easily be prevented from detaching from the bearing boss.

According to a third aspect of the present invention, in addition to the second aspect, the outer tube portion is formed in the side gear, the inner tube portion is formed in the sleeve, and a tip end portion of the elastic piece is spline-connected to the side gear.

According to the third aspect of the present invention, the sleeve can rotate together with the side gear via a spline during power transmission.

According to a fourth aspect of the present invention, in addition to the first aspect, the falling-off prevention device includes a fixed engagement portion formed on an inner periphery of the outer tube portion and a movable engagement portion formed in the inner tube portion, the movable engagement portion being capable of elastically deforming to move between a first position where the movable engagement portion is detached from the fixed engagement portion to allow withdraw of the sleeve and a second position where the movable engagement portion is engaged with the fixed engagement portion to prevent falling-out of the sleeve, and having biasing force toward the first position; and, when the drive shaft is spline-fitted to the side gear, the movable engagement portion is expanded in the radial direction by the drive shaft to be forcibly held at the second position.

According to the fourth aspect of the present invention, even after the assembly of the differential device, if the drive shaft has not been attached yet, the movable engagement portion is held at the first position by the elastic force thereof. Thus, the sleeve is released from connection with the side gear, and can be withdrawn. Accordingly, the differential gear mechanism can be disassembled, and a component thereof can be replaced. Moreover, in a state in which the drive shaft is attached, the movable engagement portion is forcibly held at the second position by the drive shaft, and therefore the sleeve can be connected to the side gear.

According to a fifth aspect of the present invention, in addition to the fourth aspect, the outer tube portion is formed in the side gear, the inner tube portion is formed in the sleeve, a splined hole is provided on an inner periphery of the inner tube portion, and the drive shaft comprises a splined shaft which expands the movable engagement portion to the second position while being fitted into the splined hole when the drive shaft is spline-fitted to the side gear.

According to the fifth aspect of the present invention, the splined shaft of the drive shaft can expand the movable engagement portion to the second position and can transmit rotation to the sleeve.

According to a sixth aspect of the present invention, in addition to the first aspect, the outer tube portion is formed in the sleeve, the inner tube portion is formed in the side gear, an annular outer locking groove is provided in an inner peripheral surface of the outer tube portion, an annular inner locking groove facing the outer locking groove is provided in an outer peripheral surface of the inner tube portion, a locking ring having a resilient force in a diameter expansion direction is attached to the outer and inner locking grooves to constitute the falling-off prevention device, the inner locking groove has a depth which allows a diameter of the locking ring to be reduced by the inner peripheral surface of the outer tube portion when the outer and inner tube portions are fitted to each other, and flat portions which come in contact with each other to connect the outer and inner tube portions in a direction of rotation are formed in fitted surfaces of the outer and inner tube portions.

According to the sixth aspect of the present invention, the outer tube portion is formed in the sleeve, and the inner tube portion is formed in the side gear. Also, the annular outer locking groove is provided in the inner peripheral surface of the outer tube portion, and the annular inner locking groove facing the outer locking groove is provided in the outer peripheral surface of the inner tube portion. The locking ring having a resilient force in the diameter expansion direction is attached to the outer and inner locking grooves. Thus, the falling-off prevention device is configured. The inner locking groove has a depth which allows the diameter of the locking ring to be reduced by the inner peripheral surface of the outer tube portion when the outer and inner tube portions are fitted to each other. In the fitted surfaces of the outer and inner tube portions, flat portions are formed which come in contact with each other to connect the outer and inner tube portions in the direction of rotation. Thus, while the sleeves have press-formable configurations, ease of assembly is good, the sleeves can be prevented from detaching from the bearing bosses, and rotation can be transmitted from the side gears to the sleeves.

The above and other objects, characteristics and advantages of the present invention will be clear from detailed descriptions of the preferred embodiments which will be provided below while referring to the attached drawings.

DESCRIPTION OF THE PREFERRED EMBODIMENTS

Hereinafter, embodiments of the present invention will be described based on the accompanying drawings.

Figure 1:
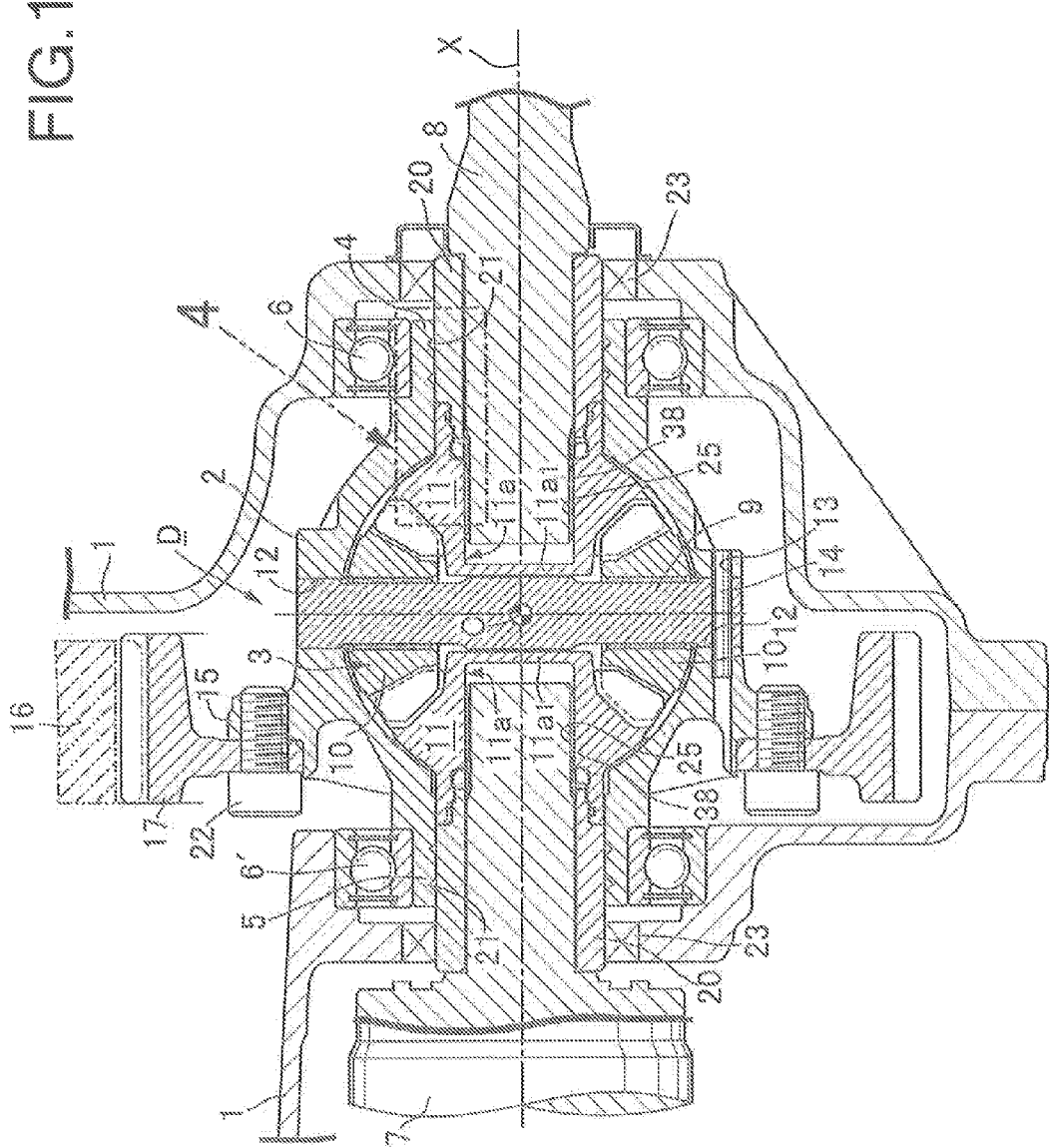
FIG. 1 is a longitudinal sectional elevation view of a differential device according to a first embodiment of the present invention.

First, a first embodiment of the present invention shown in FIGS. 1 to 5 will be described. In FIG. 1, a differential device D is housed in a transmission case 1 of an automobile. This differential device D includes an integrated differential case 2 and a differential gear mechanism 3 housed in the differential case 2. On a right side portion and a left side portion of the differential case 2, a first bearing boss 4 and a second bearing boss 5 aligned on the same axis X are formed integrally. These first and second bearing bosses 4, 5 are supported by the transmission case 1 via bearings 6, 6'.

The differential gear mechanism 3 includes a pinion shaft 9 held by the differential case 2 to pass through a center C of the differential case 2 while being orthogonal to the axis X, a pair of pinion gears 10 supported by the pinion shaft 9, a pair of side gears 11 meshing with the pinion gears 10, and a pair of sleeves 20 connected to hubs 11a of the side gears 11 and rotatably supported by the first and second bearing bosses 4, 5, respectively. A back face of each gear is rotatably supported by a spherical inner surface of the differential case 2. Helical lubrication grooves 21 are formed in inner peripheral surfaces of the first and second bearing bosses 4, 5. A structure for connecting the side gear 11 and the sleeve 20 will be described later.

The sleeves 20 are configured such that outer end portions thereof protrude from the corresponding bearing bosses 4, 5 outward, and oil seals 23 are interposed between the outer end portions and the transmission case 1, respectively.

The pinion shaft 9 is held by a pair of supporting holes 12 in an outer peripheral portion of the differential case 2. The outer peripheral portion of the differential case 2 is provided with a pin hole 13 laterally passing through the outer peripheral portion to be orthogonal to one of the supporting holes 12. A falling-off prevention pin 14 press-fitted into the pin hole 13 passes through the pinion shaft 9. This achieves prevention of the falling off of the pinion shaft 9 from the supporting holes 12.

Moreover, the differential case 2 has an annular flange 15 formed integrally therewith on an intermediate portion which is offset from the center C of the differential case 2 toward the second bearing boss 5 side. A ring gear 17 meshing with an output gear 16 of a gearbox is fastened to the flange 15 with bolts 22.

Figure 2:
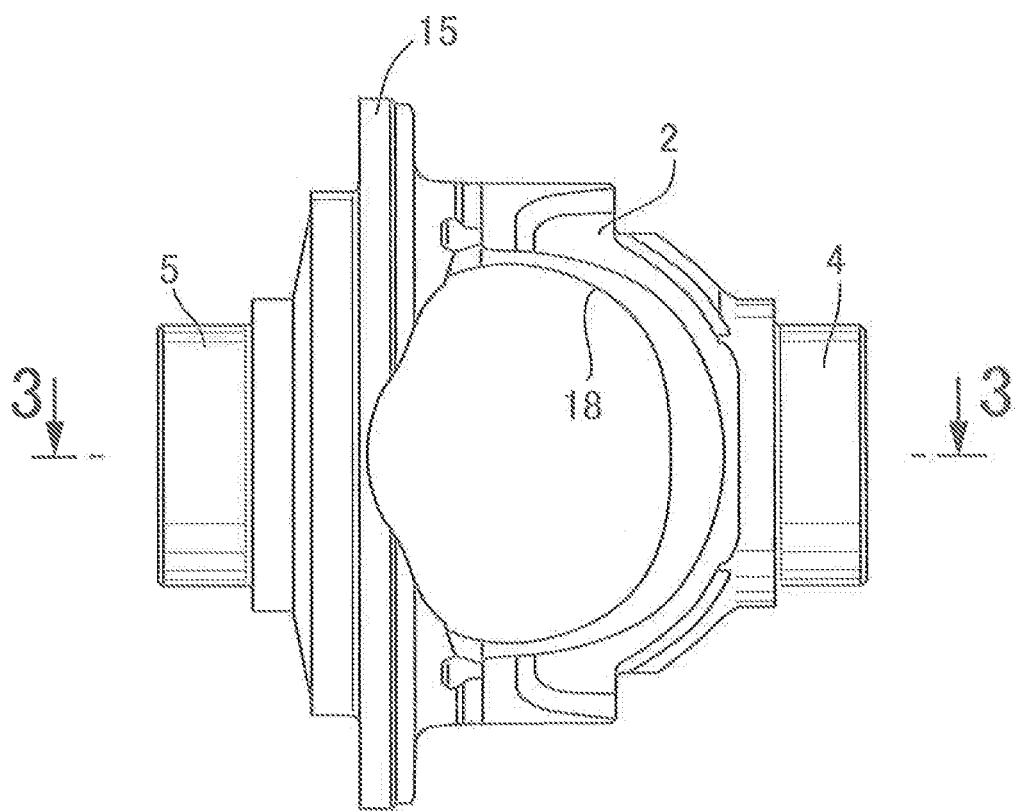
FIG. 2 is an elevation view of a differential case of the above-described differential device.
Figure 3:
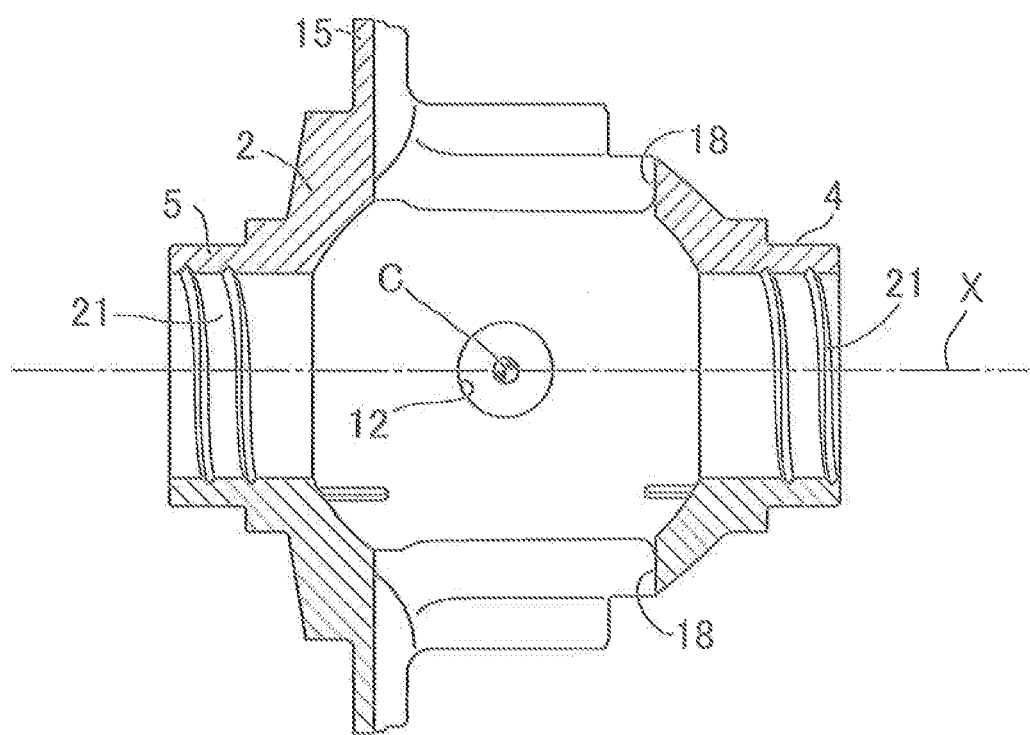
FIG. 3 is a sectional view taken along line 3-3 of FIG. 2.

As shown in FIGS. 2 and 3, in portions of a peripheral wall of the differential case 2 which face each other on a diametral line orthogonal to the axis X, a pair of work windows 18 for machining the spherical inner surface of the differential case 2 and for incorporating the differential gear mechanism 3 into the differential case 2 are provided.

Figure 4:
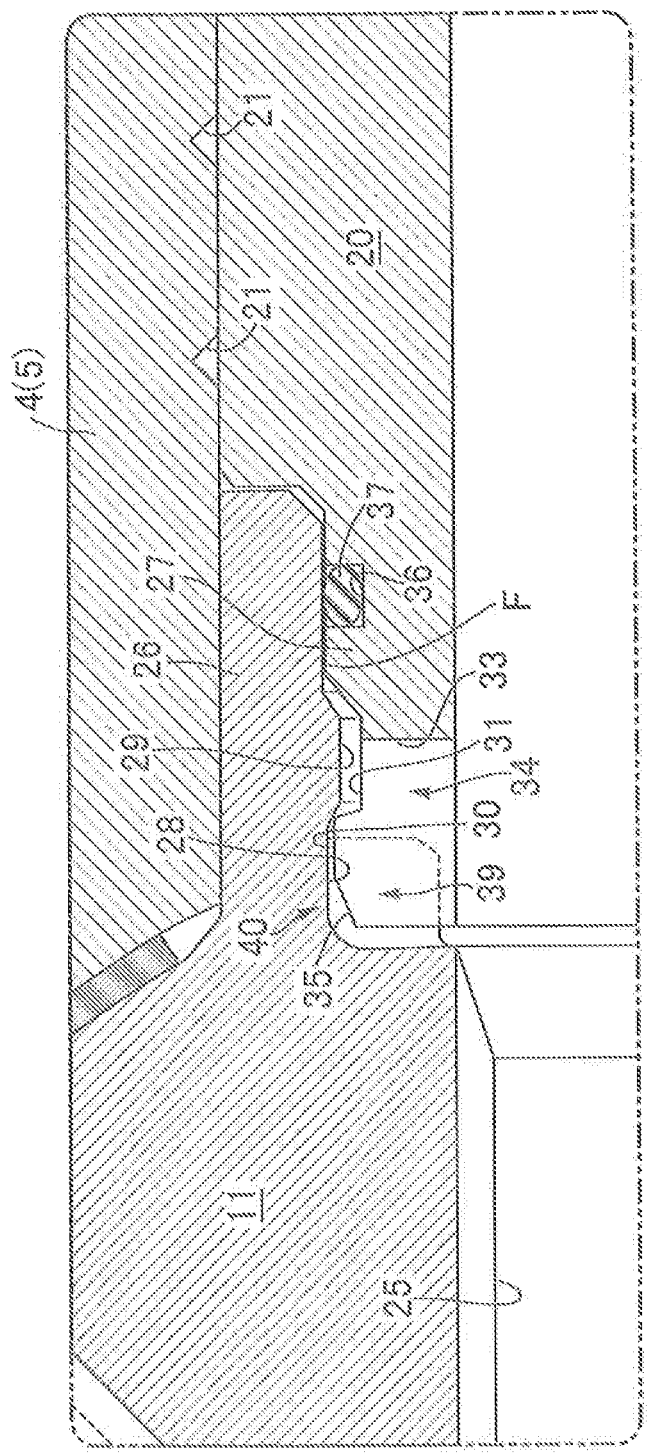
FIG. 4 is an enlarged view of a portion 4 of FIG. 1 and shows a state in which a sleeve is connected to a side gear.
Figure 5:
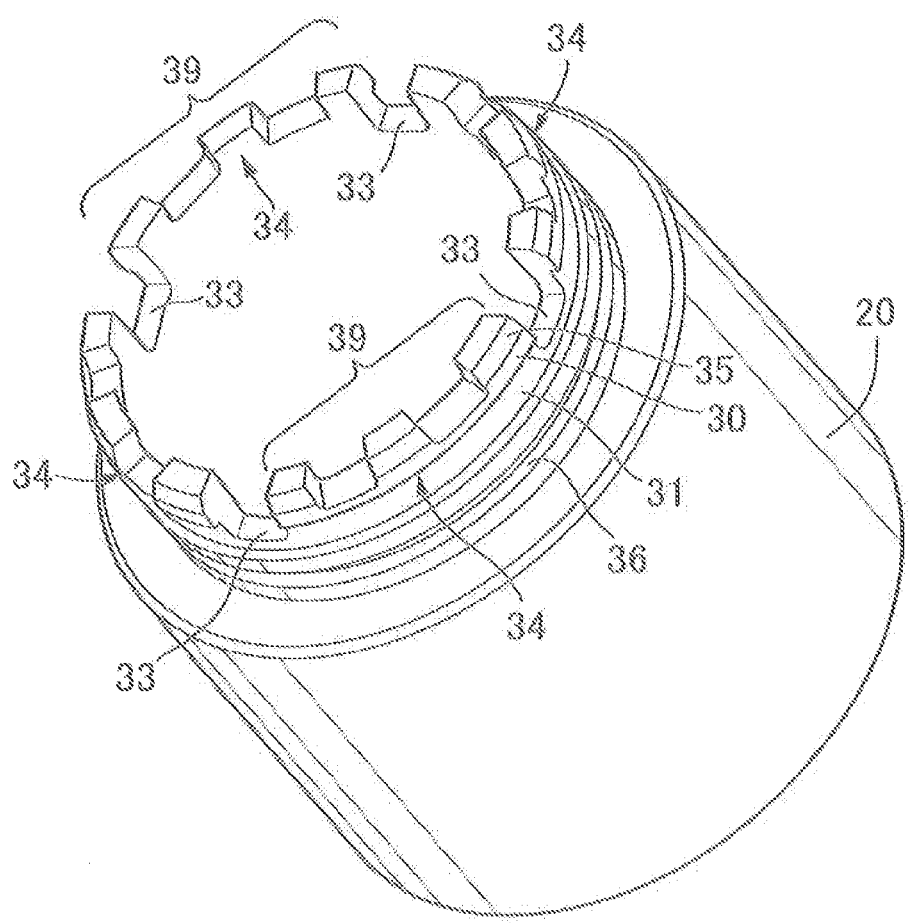
FIG. 5 is a perspective view of the sleeve in FIG. 4.

Next, a structure for connecting the side gear 11 and the sleeve 20 will be described with reference to FIGS. 1, 4, and 5.

The hub 11a of the side gear 11 is formed in a shape of a bottomed cylinder having a bottom portion $11a_1$ facing toward the pinion shaft 9, and a splined hole 25 is formed on an inner periphery of the hub 11a. Moreover, on the back face of the side gear 11, an outer tube portion 26 rotatably supported by the inner peripheral surface of the corresponding bearing boss 4 or 5 is integrally provided in a protruding manner. On an inner peripheral surface of the outer tube portion 26, an annular first locking groove 28 and an annular first locking protrusion 29 adjacent to an outside portion of the first locking groove 28 are provided.

On the other hand, an inner end portion of the sleeve 20 is formed to serve as an inner tube portion 27 which is fitted to the inner peripheral surface of the above-described outer tube portion 26. On an outer periphery of the inner tube portion 27, an annular second locking protrusion 30 and a second locking groove 31 are provided which can engage with the first locking groove 28 and the first locking protrusion 29, respectively. Moreover, in the inner tube portion 27, a plurality of (four in the shown example) cutout portions 33 are provided which extend from an end surface thereof to reach the second locking groove 31. Thus, a tip end of the inner tube portion 27 includes a plurality of elastic pieces 34 which are arranged along a peripheral direction thereof and which can bend inward in the radial direction. On an outer periphery of a tip end of each elastic piece 34, a tapered surface 35 is formed. The elastic pieces 34 and the side gear 11 are connected via a spline 39.

Thus, the first locking groove 28, the first locking protrusion 29, the second locking protrusion 30, and the second locking groove 31 constitute a falling-off prevention device 40 for preventing falling-out of the sleeve 20 from the corresponding bearing boss 4 or 5.

Moreover, in an outer peripheral surface of the inner tube portion 27, an annular seal groove 36 located more outward than the second locking groove 31 is provided. An O-ring 37 which comes in tight contact with the inner peripheral surface of the outer tube portion 26 is attached to the seal groove 36.

Left and right drive shafts 7, 8 are fitted into the left and right sleeves 20 from the outsides thereof. The drive shafts 7, 8 integrally include splined shafts 38 which are fitted into the splined holes 25 of the hubs 11a of the side gears 11.

Next, operations of this first embodiment will be described.

When the differential device D is assembled, the side gears 11 are first inserted into the differential case 2 through the work window 18, and the outer tube portions 26 are fitted to the inner peripheral surfaces of the corresponding bearing bosses 4, 5. Subsequently, the pinion gears 10 are also inserted into the differential case 2 through the work window 18 and set at predetermined positions, and the pinion shaft 9 is attached to the differential case 2.

After that, each sleeve 20 is fitted and inserted into the bearing boss 4 or 5 from the outside thereof and pushed in while the inner tube portion 27 is being fitted to the inner peripheral surface of the outer tube portion 26 of the side gear 11. The tapered surfaces 35 of the elastic pieces 34 of the inner tube portion 27 are pushed inward in the radial direction by the first locking protrusion 29 of the outer tube portion 26. Thus, the second locking protrusion 30 can pass the first locking protrusion 29 while the elastic pieces 34 are bending inward in the radial direction. After the passage, the elastic pieces 34 return to original positions by elastic restoring forces thereof. Accordingly, the second locking protrusion 30 engages with the first locking groove 28, and the second locking groove 31 engages with the first locking protrusion 29. This prevents the inner tube portion 27 from detaching from the outer tube portion 26. At the same time, the elastic pieces 34 are connected to the side gear 11 via the spline 39.

Moreover, when the inner tube portion 27 is fitted to the outer tube portion 26, the O-ring 37 attached to the seal groove 36 of the inner tube portion 27 comes in tight contact with the inner peripheral surface of the outer tube portion 26. This shuts off communication between the above-described falling-off prevention device 40 and the inside of the differential case 2.

Subsequently, the differential device D, together with an unillustrated gearbox, is incorporated into the transmission case 1. The bearings 6, 6' are set between the first and second bearing bosses 4, 5 and the transmission case 1, and the oil seals 23 are set between the sleeves 20 and the transmission case 1. After the transmission case 1 is mounted on the automobile, the drive shafts 7, 8 are fitted and inserted into the sleeves 20, and the splined shafts 38 of the drive shafts 7, 8 are fitted into the splined holes 25. At this time, the drive shafts 7, 8 are fitted to the inner peripheral surfaces of the elastic pieces 34 to prevent the elastic pieces 34 from bending inward in the radial direction. Accordingly, even when a falling-off direction load acts on the sleeve 20 for some reason, the falling-off prevention device 40 is not disengaged.

After the differential device D is housed in the transmission case 1, when lubricating oil is injected into the transmission case 1, the lubricating oil fills the inside of the differential case 2 through the work windows 18 to be used for lubrication between various portions of the differential gear mechanism 3. At this time, the lubricating oil in the transmission case 1 is prevented from leaking out of the outer peripheries of the sleeves 20 by the oil seals 23, and the lubricating oil in the differential case 2 is prevented from leaking out of the falling-off prevention device 40 by the O-rings 37. Accordingly, even when the drive shafts 7, 8 are detached for maintenance or the like after the assembly of the automobile is completed, the lubricating oil in the transmission case 1 and the differential case 2 does not leak out. Thus, lubricating oil does not need to be drained every time the drive shafts 7, 8 are removed, and ease of maintenance is good.

In this way, the falling-off prevention device 40 can prevent the sleeves 20 from detaching from the side gears 11 and the bearing bosses 4, 5, and the O-rings 37 can prevent the lubricating oil in the differential case 2 from leaking out of the falling-off prevention device 40. The ease of assembly is good.

During power transmission, rotation of the side gears 11 is transmitted to the drive shafts 7, 8 via the splined holes 25 and the splined shafts 38 and transmitted to the sleeves 20 via the splines 39.

Figure 6:
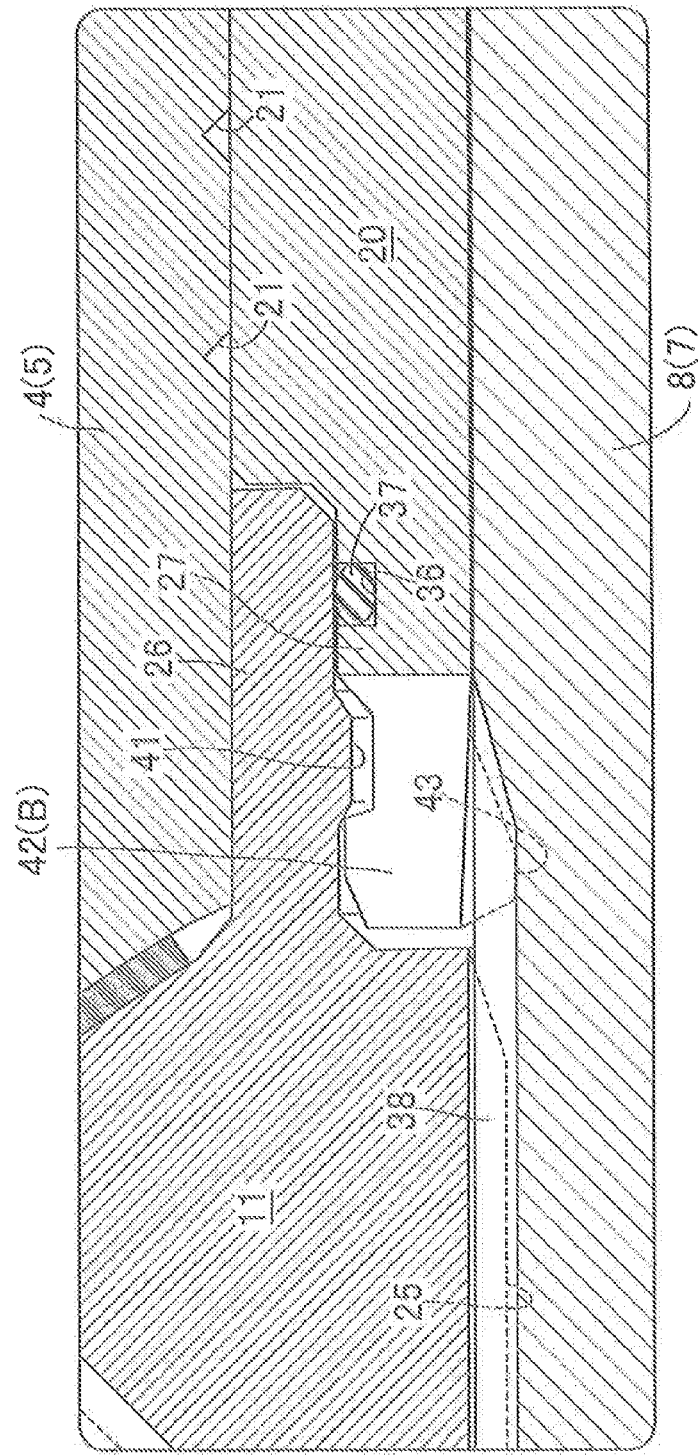
FIG. 6 is a view showing a second embodiment of the present invention and corresponding to FIG. 4.
Figure 7:
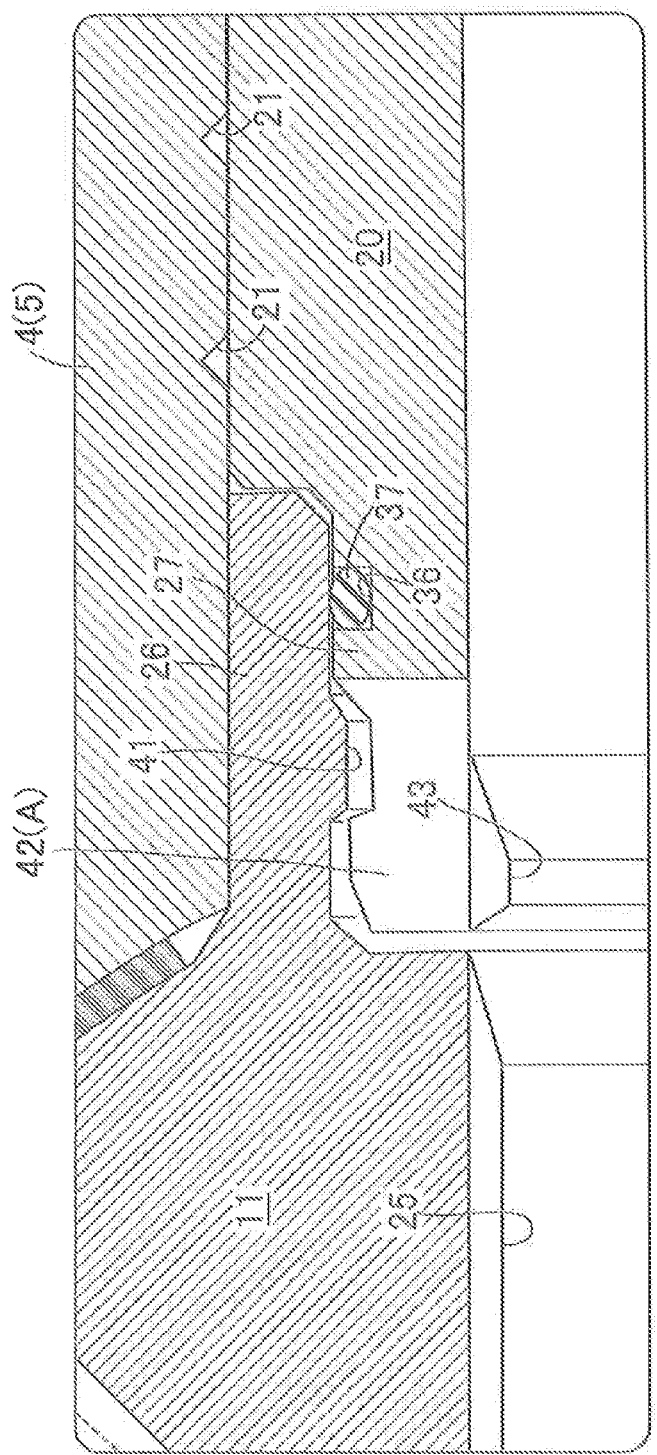
FIG. 7 is an operation explanatory view corresponding to FIG. 6 and shows a state in which the sleeve is not connected to the side gear.
Figure 8:
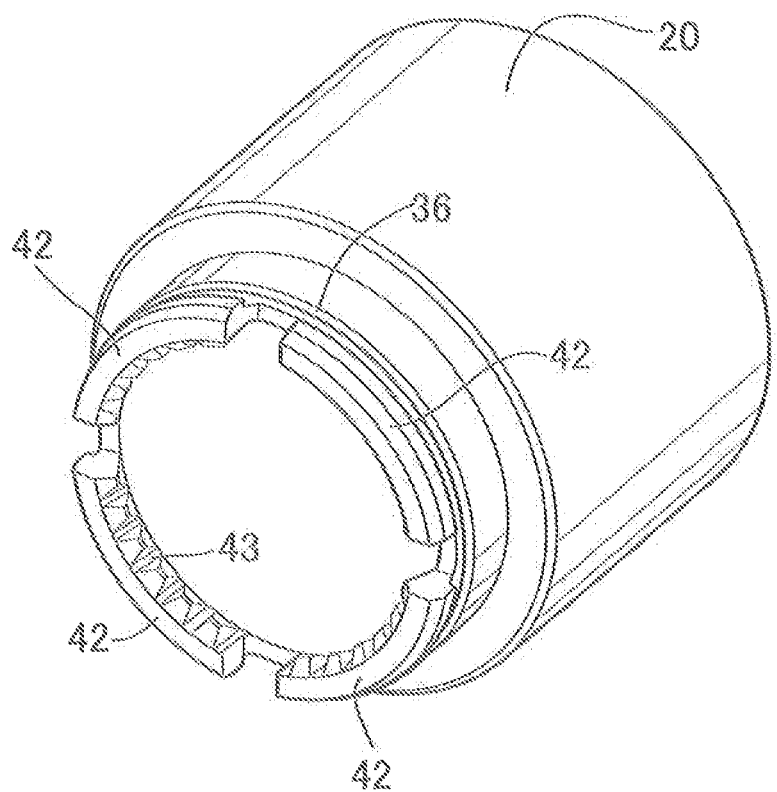
FIG. 8 is a perspective view of the sleeve in FIGS. 6 and 7.

Next, a second embodiment of the present invention shown in FIGS. 6 to 8 will be described.

In this second embodiment, the outer tube portion 26 is formed in one of the side gear 11 and the sleeve 20, and the inner tube portion 27 is formed in the other. Further, on the inner periphery of the outer tube portion 26, a fixed engagement portion 41 which is formed of an annular protrusion is formed; and in the inner tube portion 27, a plurality of movable engagement portions 42 arranged along a peripheral direction of the inner tube portion 27 are formed. The movable engagement portions 42 can bend to move between first positions A corresponding to detachment from the fixed engagement portion 41 and second positions B corresponding to engagement with the fixed engagement portion 41. Elastic biasing force which biases the movable engagement portions 42 toward the first positions A is applied to the movable engagement portions 42. The fixed engagement portion 41 and the movable engagement portions 42 described above constitute a falling-off prevention device 40.

An O-ring 37 for shutting off communication between a periphery of the fixed engagement portion 41 and the inside of the differential case 2 is set in a fitting portion F between the outer tube portion 26 and the inner tube portion 27. Specifically, an annular seal groove 36 is provided more outward than the fixed engagement portion 41 in an axial direction in the outer peripheral surface of the inner tube portion 27, and the O-ring 37 which comes in tight contact with the inner peripheral surface of the outer tube portion 26 is attached to the seal groove 36.

Moreover, on an inner periphery of the group of movable engagement portions 42, a splined hole 43 is formed which is coaxially aligned with the splined hole 25 of the side gear 11 and which has a smaller diameter than the splined shaft 38 of the drive shaft 7 or 8.

Thus, in a state in which the drive shafts 7, 8 do not exist in the sleeves 20, the movable engagement portions 42 are held at the first positions A by the elastic forces thereof and detached from the fixed engagement portion 41. Accordingly, the sleeves 20 can be withdrawn from the bearing bosses 4, 5. Therefore, the differential gear mechanism 3 can be disassembled from the differential case 2.

When the drive shaft 7 or 8 is fitted and inserted into the sleeve 20 to fit the splined shaft 38 into the splined hole 43 and the splined hole 25 in order, the movable engagement portions 42 are radially expanded to the second positions B by the press-fitting of the splined shaft 38 because the splined hole 43 is formed to have a smaller diameter than the splined shaft 38, and are engaged with the fixed engagement portion 41. Thus, the sleeve 20 can be prevented from detaching from the bearing boss 4 or 5.

Figure 9:
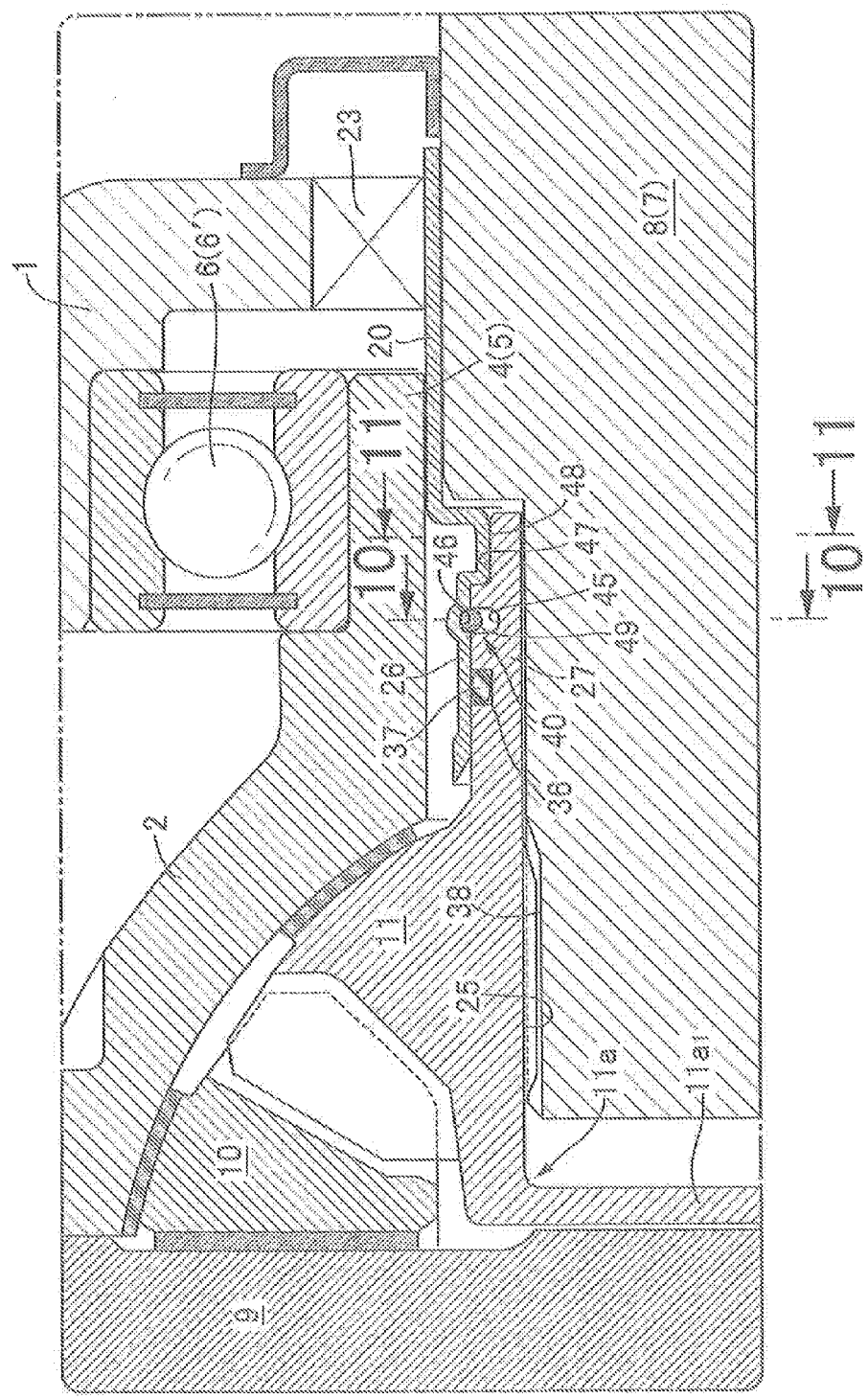
FIG. 9 is a view showing a differential device according to a third embodiment of the present invention and corresponding to FIG. 4.
Figure 10:
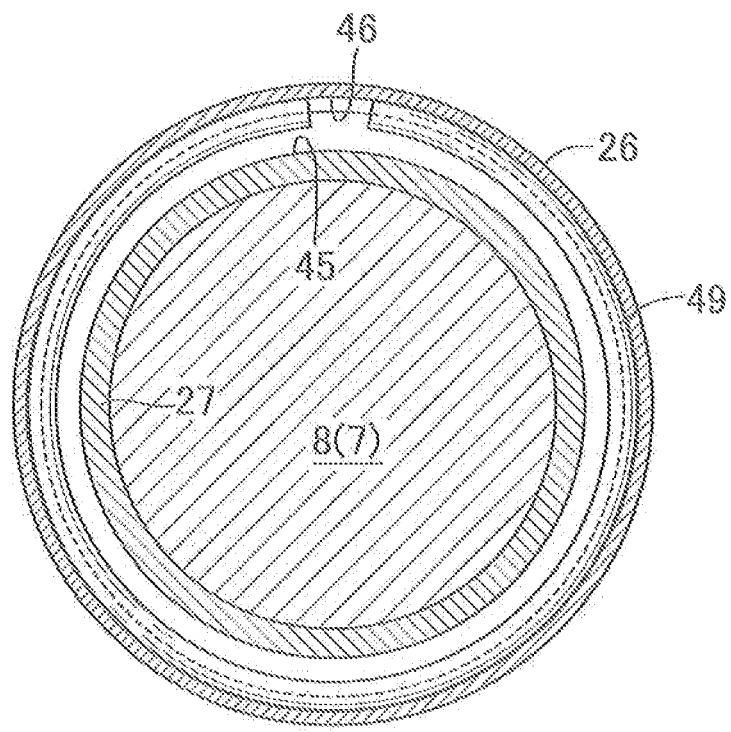
FIG. 10 is a sectional view taken along line 10-10 of FIG. 9.
Figure 11:
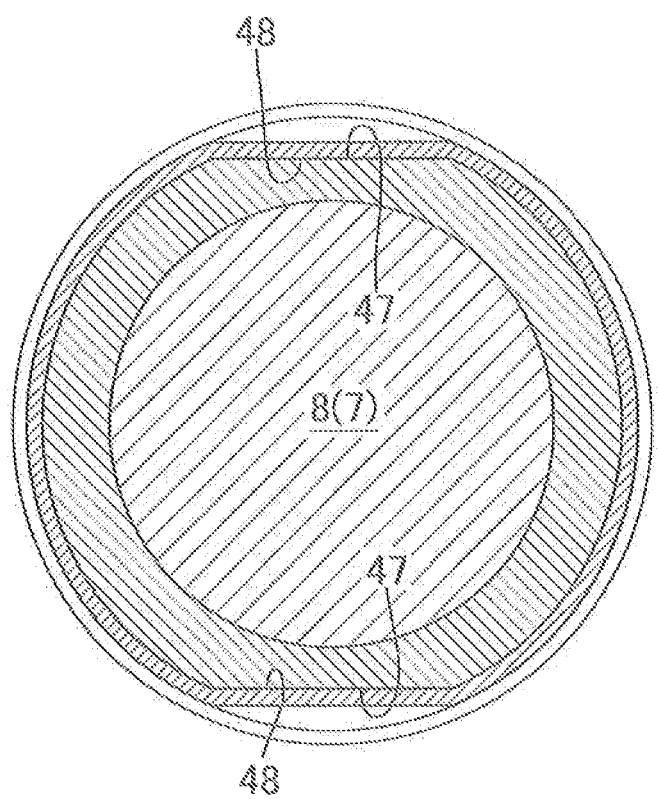
FIG. 11 is a sectional view taken along line 11-11 of FIG. 9.

Next, a third embodiment of the present invention shown in FIGS. 9 to 11 will be described.

On a back face of the side gear 11, an inner tube portion 27 is integrally provided in a protruding manner. In an outer peripheral surface of the inner tube portion 27, an annular inner locking groove 45 and an annular seal groove 36 located more inward than the inner locking groove 45 are provided. An O-ring 37 is attached to the seal groove 36. Moreover, on an outer periphery of an outer end portion of the inner tube portion 27, one or more inner flat portions 47 are provided.

The sleeves 20 which are respectively fitted to the inner peripheral surfaces of the first and second bearing bosses 4, 5 are made by pressing. An inner end portion of the sleeve 20 is formed as an outer tube portion 26 which is fitted to the outer peripheral surface of the above-described inner tube portion 27. The above-described O-ring 37 comes in tight contact with an inner peripheral surface of the outer tube portion 26. Moreover, an annular outer locking groove 46 which faces the above-described inner locking groove 45 is provided in the outer tube portion 26. A locking ring 49 having a resilient force in a diameter expansion direction is attached to the inner and outer locking grooves 45, 46. The above-described inner locking groove 45 has a depth which allows the diameter of the locking ring 49 to be reduced by the inner peripheral surface of the outer tube portion 26 when the outer and inner tube portions 26, 27 are fitted to each other. Thus, the above-described inner locking groove 45, the outer locking groove 46, and the locking ring 49 constitute a falling-off prevention device 40 for preventing the sleeve 20 from detaching from the bearing boss 4 or 5.

Moreover, an outer flat portion 48 which comes in contact with the inner flat portion 47 is formed in the outer tube portion 26.

Except for the above-described points, the configuration of this embodiment is similar to that of the first embodiment. Accordingly, portions corresponding to those of the first embodiment are denoted by the same reference numerals in FIGS. 9 to 11, and explanations which have already been made in the first embodiment will be omitted.

According to this third embodiment, while the sleeves 20 have press-formable configurations, ease of assembly is good, the sleeves 20 can be prevented from detaching from the bearing bosses 4, 5, the lubricating oil in the differential case 2 can be prevented from leaking out of the falling-off prevention device 40, and rotation can be transmitted from the side gears 11 to the sleeves 20.

The present invention is not limited to the above-described embodiments, but various design changes can be made without departing from the gist thereof. For example, the fastening of the ring gear 17 and the flange 15 with bolts may be replaced by joining by welding. Moreover, to prevent the lubricating oil in the differential case 2 from flowing out into the hubs 11a of the side gears 11, plugs may be press-fitted to the inner peripheries of the hubs 11a in a liquid tight manner instead of the bottom portions $11a_1$ of the hubs 11a.

What is claimed is:

1. A differential device comprising:
   a differential gear mechanism; and
   an integrated differential case housing the differential gear mechanism, the differential case including: first and second bearing bosses formed integrally on one side portion and another side portion of the differential case and aligned on a same axis to be rotatably supported by a transmission case; a work window for inserting the differential gear mechanism, the work window being provided in a peripheral wall of the differential case; and a pair of sleeves fitted into the first and second bearing bosses from sides of outer ends thereof,
   wherein oil seals are to be set between outer end portions of the sleeves which protrude from the first and second bearing bosses and the transmission case, left and right drive shafts are to be fitted and inserted into the sleeves and to be spline-fitted to a pair of left and right side gears of the differential gear mechanism which are configured to have the drive shafts spline-fitted thereto, and the sleeves are configured to be connected to the side gears or the drive shafts, wherein for each of said sleeve and the side gear corresponding thereto an outer tube portion is formed in one of the side gear and the sleeve, and an inner tube portion fitted to an inner periphery of the outer tube portion is formed in the other, the outer tube portion and the inner tube portion being fitted with each other in a separable state, a falling-off prevention device for preventing unintended separation of the outer and inner tube portions when the left and right drive shafts are inserted in the sleeves and spline-fitted to the side gears, is provided between the outer and inner tube portions, and a seal member for shutting off communication between the falling-off prevention device and an inside of the differential case and thereby preventing leakage of oil inside the differential case to an outside through the falling-off prevention device is disposed in a fitting portion between the outer and inner tube portions.

2. The differential device according to claim 1, wherein the falling-off prevention device includes an annular first locking groove formed on an inner periphery of the outer tube portion, an annular first locking protrusion adjacent to the first locking groove, and an elastic piece formed in an inner end portion of the inner tube portion, the elastic piece having a second locking protrusion and a second locking groove configured to respectively engage with the first locking groove and the first locking protrusion and being configured to bend inward in a radial direction; when the inner tube portion is inserted into the outer tube portion, and the second locking protrusion passes through the first locking protrusion, the elastic piece is bent inward in the radial direction by the first locking protrusion; and, after passage of the second locking protrusion through the first locking protrusion, the second locking protrusion and the second locking groove are respectively engaged with the first locking groove and the first locking protrusion by return of the elastic piece to a free state.

3. The differential device according to claim 2, wherein the outer tube portion is formed in the side gear, the inner tube portion is formed in the sleeve, and a tip end portion of the elastic piece is spline-connected to the side gear.

4. The differential device according to claim 2, wherein the seal member is disposed in an annular groove formed in inner tube portion, and the annular groove extends closer to the corresponding bearing boss than the falling-off prevention device.

5. The differential device according to claim 1, wherein the outer tube portion is formed in the sleeve, the inner tube portion is formed in the side gear, an annular outer locking groove is provided in an inner peripheral surface of the outer tube portion, an annular inner locking groove facing the outer locking groove is provided in an outer peripheral surface of the inner tube portion, a locking ring having a resilient force in a diameter expansion direction is attached to the outer and inner locking grooves to constitute the falling-off prevention device, the inner locking groove has a depth which allows a diameter of the locking ring to be reduced by the inner peripheral surface of the outer tube portion when the outer and inner tube portions are fitted to each other, and flat portions which come in contact with each other to connect the outer and inner tube portions in a direction of rotation are formed in fitted surfaces of the outer and inner tube portions.

6. The differential device according to claim 1, wherein the falling-off prevention device is located more inwardly of the differential case than the seal member in the fitting portion between the outer and inner tube portions.

7. The differential device according to claim 1, wherein the falling-off prevention device includes an elastic member which is deformable for permitting the drive shafts to be fitted to or removed from the sleeves and the side gears through the falling-off prevention device.

8. The differential device according to claim 1, wherein the portions of the side gears which are to be spline-fitted to the drive shafts are spaced from and disposed more inwardly of the differential case than portions of the side gears which are fitted to the sleeves.

* * * * *